(12) United States Patent
Roy et al.

(10) Patent No.: US 11,698,934 B2
(45) Date of Patent: Jul. 11, 2023

(54) GRAPH-EMBEDDING-BASED PARAGRAPH VECTOR MACHINE LEARNING MODELS

(71) Applicant: Optum, Inc., Minnetonka, MN (US)

(72) Inventors: Suman Roy, Bangalore (IN); Amit Kumar, Gaya (IN); Ayan Sengupta, Noida (IN); Riccardo Mattivi, Dublin (IE); Ahmed Selim, Dublin (IE); Shashi Kumar, Bengaluru (IN)

(73) Assignee: Optum, Inc., Minnetonka, MN (US)

( * ) Notice: Subject to any disclaimer, the term of this patent is extended or adjusted under 35 U.S.C. 154(b) by 3 days.

(21) Appl. No.: 17/466,594

(22) Filed: Sep. 3, 2021

(65) Prior Publication Data

US 2023/0079343 A1 Mar. 16, 2023

(51) Int. Cl.
*G06F 7/02* (2006.01)
*G06F 16/00* (2019.01)
*G06F 16/93* (2019.01)
*G06F 16/901* (2019.01)
G06F 16/36 (2019.01)
G06N 20/00 (2019.01)

(52) U.S. Cl.
CPC .......... *G06F 16/93* (2019.01); *G06F 16/9024* (2019.01); *G06F 16/36* (2019.01); *G06N 20/00* (2019.01)

(58) Field of Classification Search
CPC ...... G06F 16/93; G06F 16/9024; G06F 16/36; G06N 20/00
See application file for complete search history.

(56) References Cited

U.S. PATENT DOCUMENTS

| 7,177,798 | B2 | 2/2007 | Hsu et al. |
| 10,187,399 | B2 | 1/2019 | Katz |
| 10,360,507 | B2 | 7/2019 | Aravamudan et al. |
| 10,402,909 | B1 | 9/2019 | Khalak et al. |
| 10,459,962 | B1 | 10/2019 | Jayaraman et al. |
| 11,222,031 | B1 | 1/2022 | Mohandas |
| 2003/0217052 | A1 | 11/2003 | Rubenczyk et al. |
| 2018/0129944 | A1* | 5/2018 | Meunier ................ G06N 20/00 |

(Continued)

FOREIGN PATENT DOCUMENTS

CN 105894088 A 8/2016
WO 2017/161316 A1 9/2017

OTHER PUBLICATIONS

Notice of Allowance and Fee(s) Due for U.S. Appl. No. 16/946,175, dated Oct. 4, 2022, (7 pages), United States Patent and Trademark Office, US.

(Continued)

*Primary Examiner* — Bruce M Moser
(74) *Attorney, Agent, or Firm* — Alston & Bird LLP

(57) ABSTRACT

Various embodiments of the present invention provide methods, apparatus, systems, computing devices, computing entities, and/or the like for performing predictive structural analysis on document data objects that are associated with an ontology graph. Certain embodiments of the present invention utilize systems, methods, and computer program products that perform predictive data analysis operations on document data objects that are associated with an ontology graph using document embeddings that are generated by graph-embedding-based paragraph vector machine learning models.

21 Claims, 7 Drawing Sheets

(56) References Cited

U.S. PATENT DOCUMENTS

| | | |
|---|---|---|
| 2019/0057774 A1 | 2/2019 | Velez et al. |
| 2019/0130025 A1 | 5/2019 | Crudele et al. |
| 2020/0057946 A1 | 2/2020 | Singaraju et al. |
| 2020/0184016 A1 | 6/2020 | Roller |
| 2020/0226321 A1 | 7/2020 | Burns et al. |
| 2020/0311262 A1 | 10/2020 | Nguyen et al. |
| 2021/0012215 A1 | 1/2021 | Fei et al. |
| 2021/0042586 A1 | 2/2021 | Toyoshiba |
| 2021/0295822 A1* | 9/2021 | Tomkins ............... G06F 16/328 |
| 2021/0383068 A1 | 12/2021 | Mattivi et al. |
| 2021/0383070 A1* | 12/2021 | Hunter ................. G06F 40/103 |

OTHER PUBLICATIONS

Bordes, Antoine et al. "Translating Embeddings for Modeling Multi-Relational Data," Advances on Neural Information Processing Systems: Proceedings of the 26th International Conference on Neural Information Processing Systems, vol. 2, Dec. 2013, (9 pages), DOI: 10.5555/2999792.2999923.

Islam, Saiful, et al., "A Systematic Review on Healthcare Analytics: Application and Theoretical Perspective of Data Mining", May 23, 2018, Healthcare, 43 pages, 6, 54, www.mdpi.com/journal/healthcare.

Le, Quoc et al. "Distributed Representations of Sentences and Documents," Proceedings of the 31st International Conference on Machine Learning, PMLR, vol. 32, No. 2, Jun. 18, 2014 (9 pages).

Ling, Yuan Ling et al. "Integrating Extra Knowledge Into Word Embedding Models for Biomedical NLP Tasks," In 2017 International Joint Conference on Neural Networks (IJCNN), May 14, 2017 (8 pages), IEEE.

Mai, Gengchen et al. "Combining Text Embedding and Knowledge Graph Embedding Techniques for Academic Search Engines," In Semdeep/NLIWoD@ ISWC, Oct. 2018, pp. 77-88.

Mikolov Tomas et al. "Distributed Representations of Words and Phrases and Their Compositionality," In Advances in Neural Information Processing Systems 26, 27th Annual Conference on Neural Information Processing Systems (2013), (9 pages).

Sun, Haixia et al. "Medical Knowledge Graph to Enhance Fraud, Waste, and Abuse Detection on Claim Data: Model Development ad Performance Evaluation," JMIR Medical Informatics, Jul. 2020, vol. 8, No. 7:e17653, Published Online Jul. 23, 2020, (26 pages), DOI: 10.2196/17653, PMCID: PMC7413281, PMID: 32706714.

Trouillon, Théo et al. "Complex Embeddings for Simple Link Prediction," In International Conference on Machine Learning, Jun. 11, 2016, (10 pages).

Wang, Zhen et al. "Knowledge Graph Embedding by Translating on Hyperplanes," Proceedings of the Twenty-Eighth AAAI Conference on Artificial Intelligence, vol. 28, No. 1, pp. 1112-1119, Jun. 21, 2014, DOI: 10.5555/2893873.2894046.

Yang, Bishan et. al. "Embedding Entities and Relations for Learning and Inference in Knowledge Bases," ICLR (Poster) 2015, arXiv:1412.6575v4 [cs.CL] Aug. 29, 2015, (12 pages).

Chen, Yuwen et al. "Automatic ICD Code Assignment Utilizing Textual Descriptions and Hierarchical Structure of ICD Code," 2019 IEEE International Conference on Bioinformatics and Biomedicine (BIBM), pp. 348-353, IEEE, 2019, Nov. 18, 2019.

NonFinal Office Action for U.S. Appl. No. 16/946,175, dated Jun. 23, 2022, (32 pages), U.S. Patent and Trademark Office, US.

Ten, Fei, et al. "Automatic Medical Code Assignment via Deep Learning Approach for Intelligent Healthcare," IEEE Journal of Biomedical and Health Informatics, vol. 24, No. 9, pp. 2506-2515, Sep. 2020.

* cited by examiner

| Member ID | Clinical Codes | WFA Score |
|---|---|---|
| 2343252 | X1234, RF213 | 0.90 |
| 3252345 | XR44 | 0.88 |
| 2345342 | SS3243 | 0.77 |

GRAPH-EMBEDDING-BASED PARAGRAPH VECTOR MACHINE LEARNING MODELS

BACKGROUND

Various embodiments of the present invention address technical challenges related to performing predictive structural analysis and provide solutions to address the efficiency and reliability shortcomings of various existing predictive structural analysis solutions.

BRIEF SUMMARY

In general, various embodiments of the present invention provide methods, apparatus, systems, computing devices, computing entities, and/or the like for performing predictive structural analysis on document data objects that are associated with an ontology graph. Certain embodiments of the present invention utilize systems, methods, and computer program products that perform predictive data analysis operations on document data objects that are associated with an ontology graph using document embeddings that are generated by graph-embedding-based paragraph vector machine learning models.

In accordance with one aspect, a method is provided. In one embodiment, the method comprises: identifying a plurality of word vectors associated with the document data object; identifying one or more relationships of the document data object based at least in part on the ontology graph; determining, based at least in part on the plurality of word vectors and the one or more relationships, and using a graph-embedding-based paragraph vector machine learning model, the document representation and one or more relational representations for the one or more relationships, wherein: the graph-embedding-based paragraph vector machine learning model is configured to optimize a textual-relational optimization output that comprises a textual optimization sub-output and a relational optimization sub-output, the textual optimization sub-output is generated based at least in part on the plurality of word vectors and the document representation, and the relational optimization sub-output is generated based at least in part on the document representation and the one or more relational representations; and performing one or more prediction-based actions based at least in part on at least one of the document representation and the one or more relational representations.

In accordance with another aspect, a computer program product is provided. The computer program product may comprise at least one computer-readable storage medium having computer-readable program code portions stored therein, the computer-readable program code portions comprising executable portions configured to: identify a plurality of word vectors associated with the document data object; identify one or more relationships of the document data object based at least in part on the ontology graph; determine, based at least in part on the plurality of word vectors and the one or more relationships, and using a graph-embedding-based paragraph vector machine learning model, the document representation and one or more relational representations for the one or more relationships, wherein: the graph-embedding-based paragraph vector machine learning model is configured to optimize a textual-relational optimization output that comprises a textual optimization sub-output and a relational optimization sub-output, the textual optimization sub-output is generated based at least in part on the plurality of word vectors and the document representation, and the relational optimization sub-output is generated based at least in part on the document representation and the one or more relational representations; and perform one or more prediction-based actions based at least in part on at least one of the document representation and the one or more relational representations.

In accordance with yet another aspect, an apparatus comprising at least one processor and at least one memory including computer program code is provided. In one embodiment, the at least one memory and the computer program code may be configured to, with the processor, cause the apparatus to: identify a plurality of word vectors associated with the document data object; identify one or more relationships of the document data object based at least in part on the ontology graph; determine, based at least in part on the plurality of word vectors and the one or more relationships, and using a graph-embedding-based paragraph vector machine learning model, the document representation and one or more relational representations for the one or more relationships, wherein: the graph-embedding-based paragraph vector machine learning model is configured to optimize a textual-relational optimization output that comprises a textual optimization sub-output and a relational optimization sub-output, the textual optimization sub-output is generated based at least in part on the plurality of word vectors and the document representation, and the relational optimization sub-output is generated based at least in part on the document representation and the one or more relational representations; and perform one or more prediction-based actions based at least in part on at least one of the document representation and the one or more relational representations.

BRIEF DESCRIPTION OF THE DRAWINGS

Figure 1:
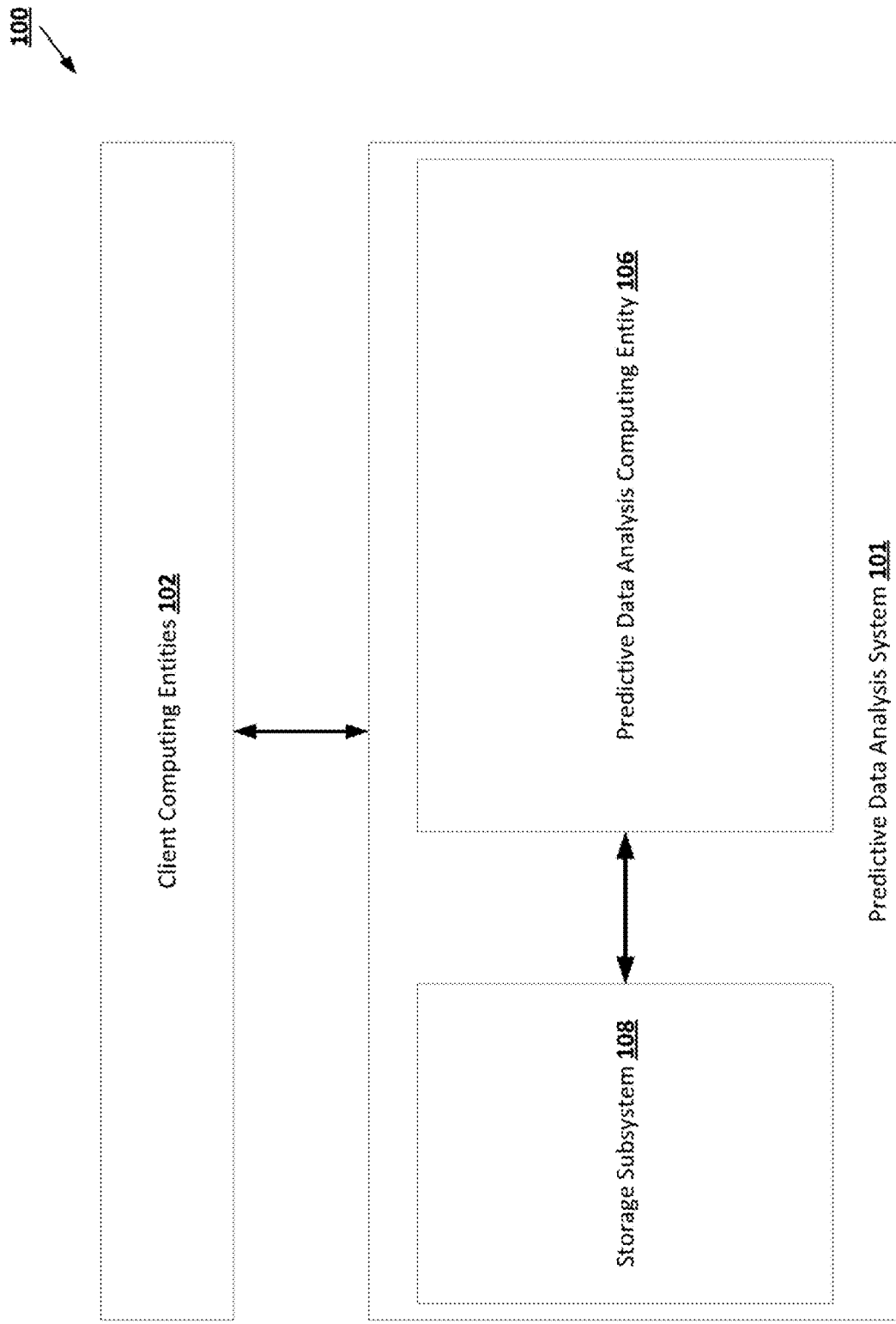

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
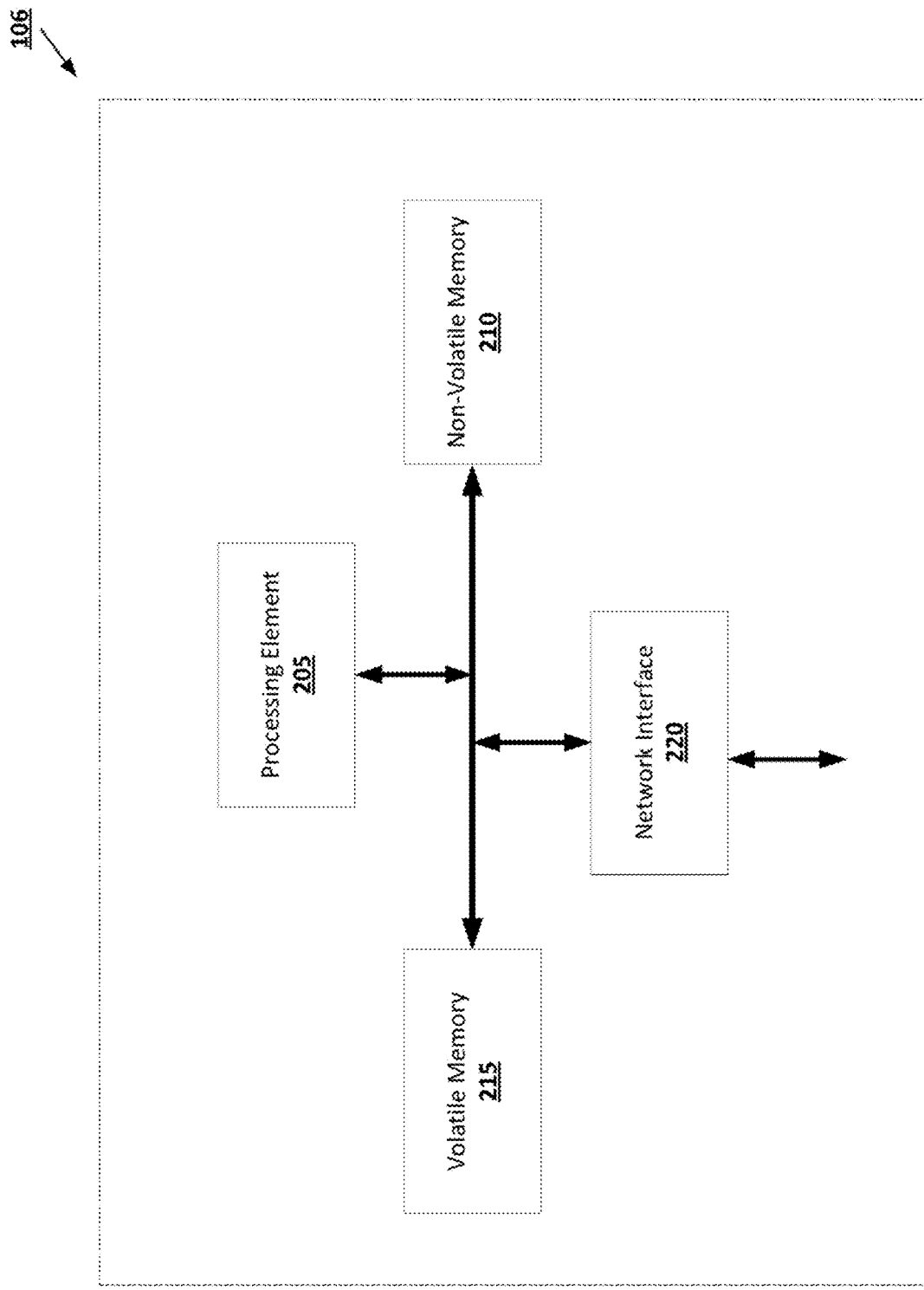

FIG. 2 provides an example predictive data analysis computing entity in accordance with some embodiments discussed herein.

Figure 3:
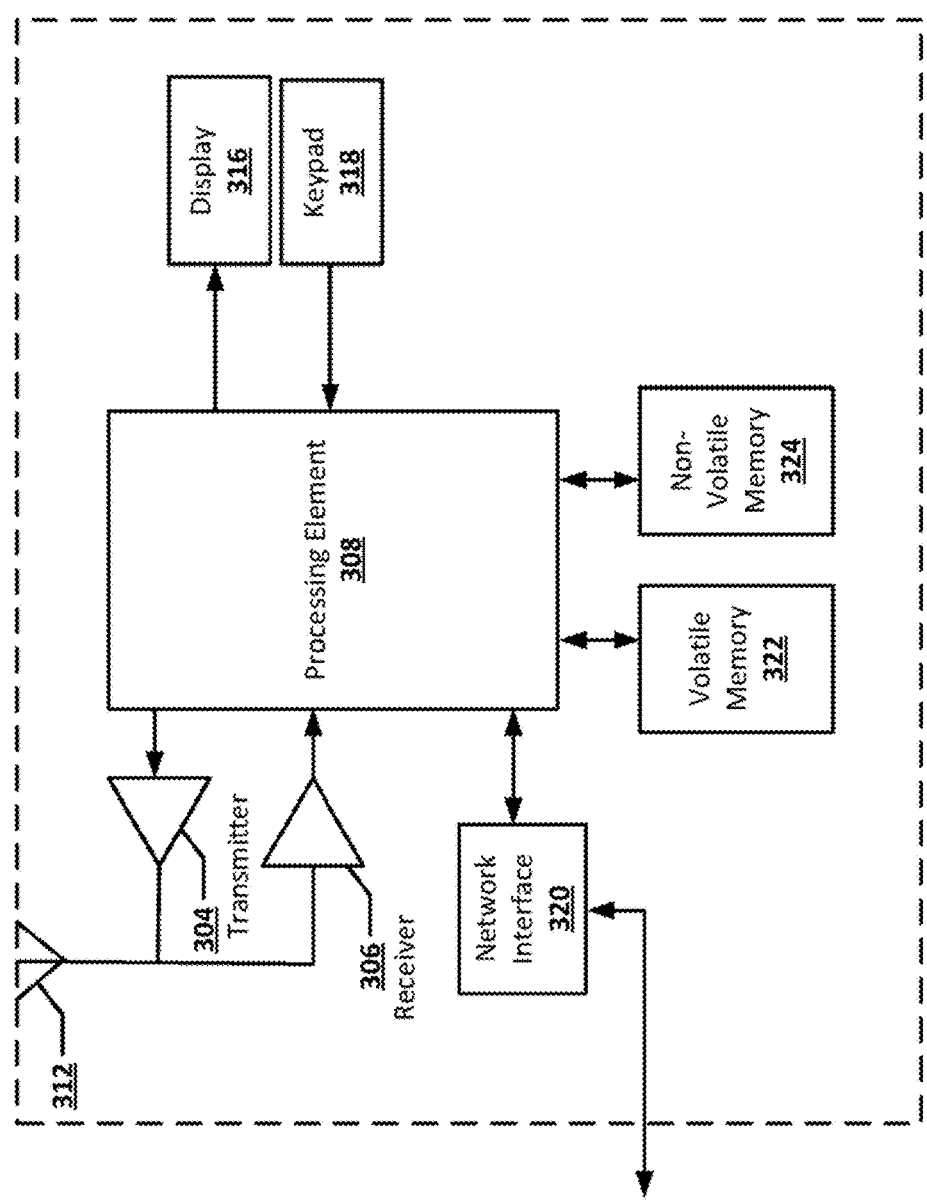

FIG. 3 provides an example client computing entity in accordance with some embodiments discussed herein.

Figure 4:
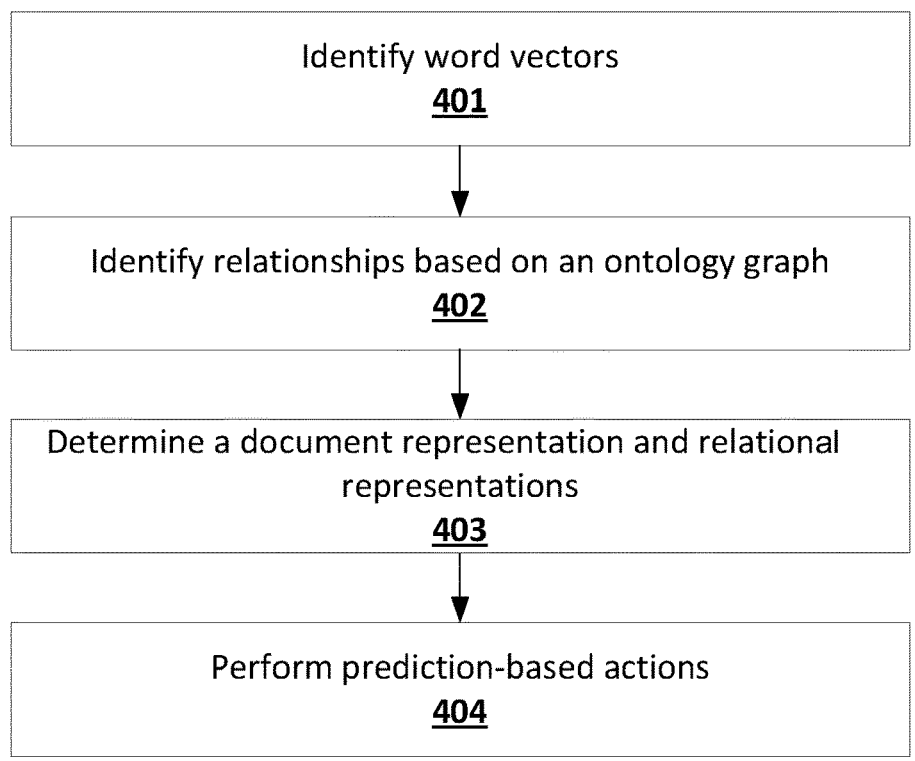

FIG. 4 is a flowchart diagram of an example process for generating a document representation for a document data object in accordance with some embodiments discussed herein.

Figure 5:
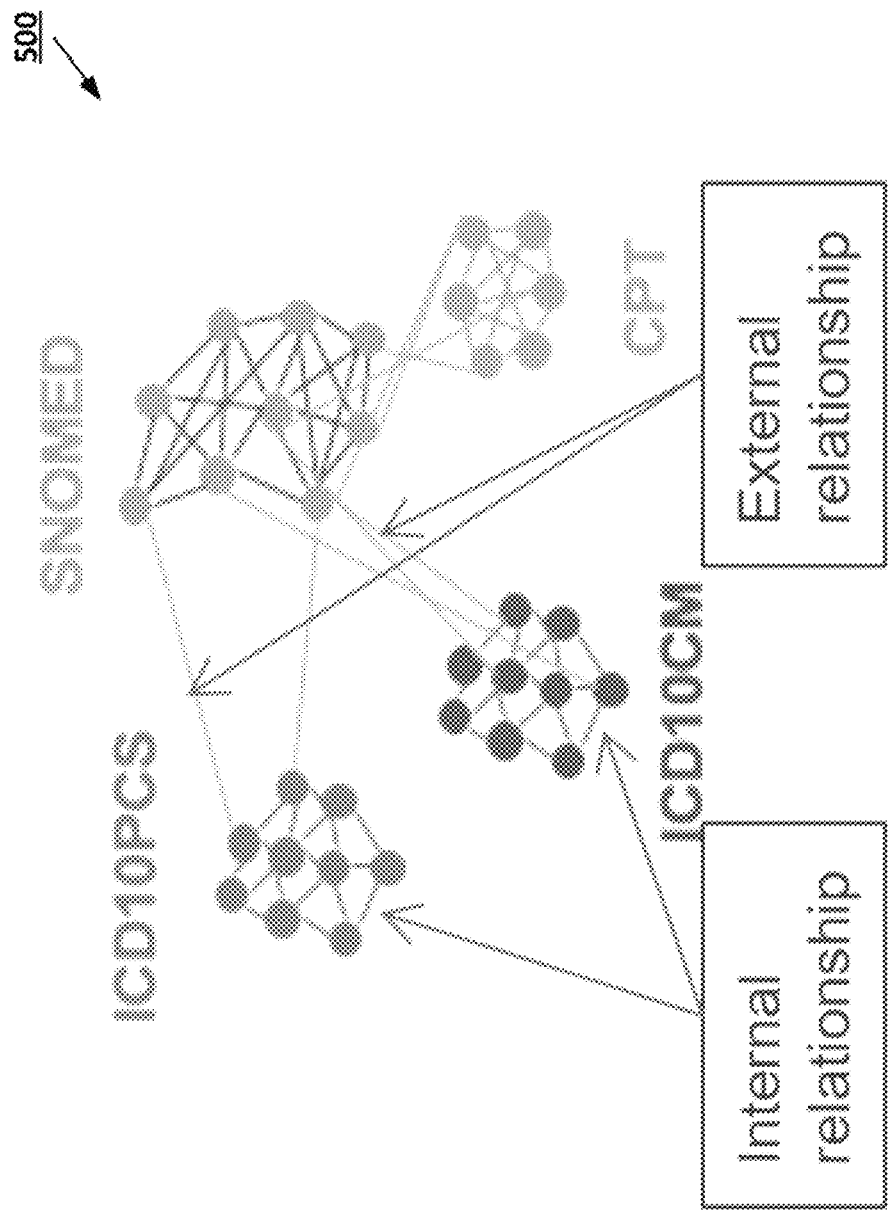

FIG. 5 provides an operational example of an ontology graph in accordance with some embodiments discussed herein.

Figure 6:
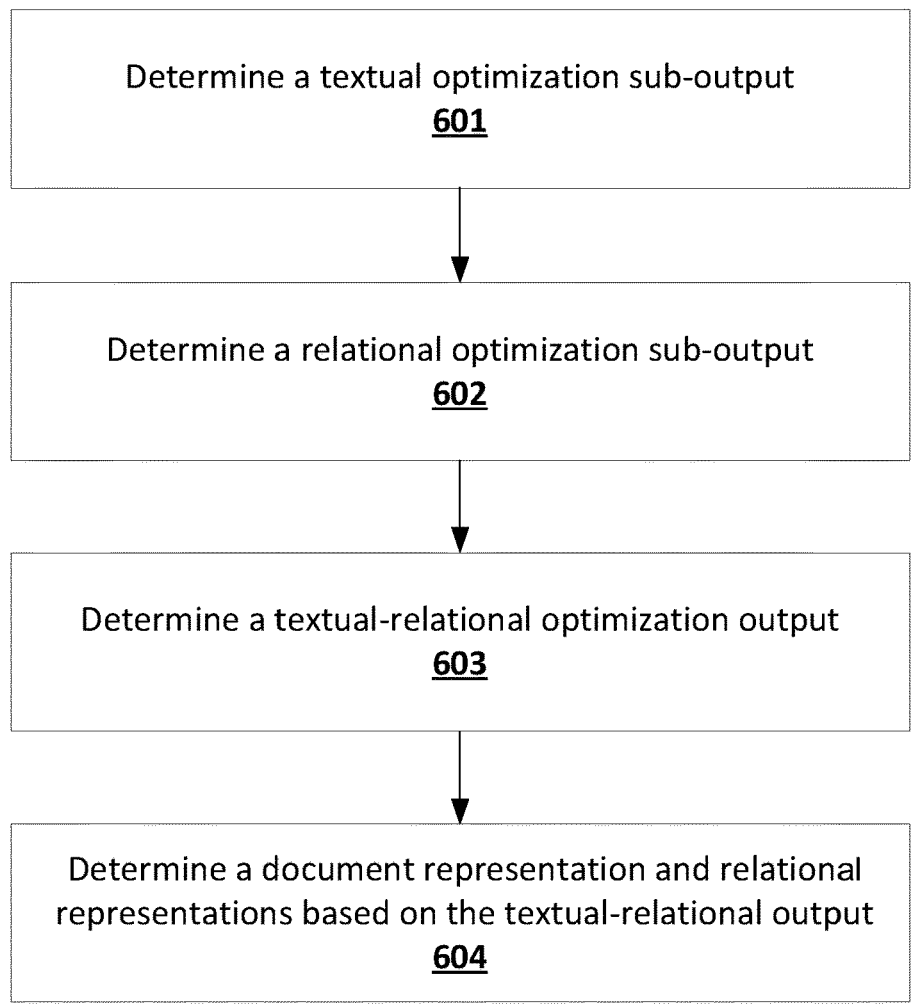

FIG. 6 is a flowchart diagram of an example process for generating a document representation and a set of relational representations for a document data object using a graph-embedding-based paragraph vector machine learning model in accordance with some embodiments discussed herein.

FIG. 7 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

As described in greater detail below, various embodiments of the present invention introduce techniques for training graph-embedding-based document embedding generation that can integrate graph-based inferences into the predictions performed by the graph-embedding-based document embedding generation machine learning models without incurring extensive computational cost and storage resources to train the noted graph-embedding-based document embedding generation machine learning models. In this way, various embodiments of the present invention improve computational efficiency and storage efficiency of performing predictive data analysis on hierarchical document data objects and make important technical contributions to the field of predictive data analysis.

For example, various embodiments of the present invention introduce graph-embedding-based distributed memory paragraph vector machine learning models that can be trained only to detect word embeddings. Once training is accomplished, the word vectors can be used as part of a textual-relational optimization relationship to determine document embeddings and relationship embeddings. In this way, the introduced graph-embedding-based distributed memory paragraph vector machine learning models have a limited number of trainable parameters and training objectives, a feature that in turn makes training of such models more computationally efficient and storage-wise efficient. Accordingly, various embodiments of the present invention improve computational efficiency and storage efficiency of performing predictive data analysis on hierarchical document data objects and make important technical contributions to the field of predictive data analysis.

In some embodiments, the textual-relational optimization output is generated by summing a per-document textual-relational optimization output across a set of document data objects, where the per-document textual-relational optimization output is determined based at least in part on a textual optimization sub-output for the document data object and a relational optimization sub-output for the document data object. In some of the noted embodiments, the textual optimization sub-output for a particular document data object is generated based at least in part on a plurality of word vectors for the document data object. In some embodiments, the relational optimization sub-output for a particular document data object is determined based at least in part on each weighted distance value for a secondary document object of the plurality of document objects other than the document object, where each weighted distance value is determined based at least in part on a distance value between a corresponding secondary document object and the document object as well as a relational representation for a relationship type of the secondary document object and the particular document object. In some embodiments, the relational optimization sub-output for a particular document data object is determined based at least in part on each positive distance measure for a positive relationship in a positive subset of the one or more relationships and each negative distance measure for a negative relationship in the negative subset of the one or more relationships, where each positive distance measure is a translational distance measure between: (i) a sum of: (a) a first document representation for a first document object associated with a corresponding positive relationship and the relational representation for the corresponding positive relationship, and (ii) a second document representation for a second document object associated with the corresponding positive relationship, and each negative distance measure is a translational distance measure between: (i) a sum of: (a) a first document representation for a first document object associated with a corresponding negative relationship and the relational representation for the corresponding negative relationship, and (ii) a second document representation for a second document object associated with the corresponding negative relationship.

An exemplary application of various embodiments of the present invention relates to learning embedded representations of clinical codes with relations. In many applications, different clinical codes need to be represented as fixed-dimensional vectors, in which the semantics denoting the short text description of codes along with the ontological relations between codes (both within each code family and among the code families) need to be captured. To address the noted challenge, various embodiments of the present invention use a combined representation of all the clinical codes available in the claim data for a claim as a finite-dimensional vector of a fixed size. This vector along with other categorical features like member gender, as well as continuous features like amount paid, will be fed as input to a classifier model. To generate the finite-dimensional vector representations of clinical codes associated with a claim, a proposed system can use a paragraph vector approach. In some embodiments, according to a paragraph vector approach, paragraphs are learned by training the vector representation of words in a paragraph. The paragraph vector is concatenated with several relevant word vectors from a paragraph for predicting the following word in the given context. In some embodiments, paragraph vectors are unique, while the word vectors are shared. A stochastic gradient descent method may in some embodiments be used to train both word vectors and paragraph vectors. During the prediction, the training system may fix the word vectors to predict paragraph vectors while training the new paragraph vector until convergence.

Various embodiments of the present invention further use extra knowledge from clinical code ontologies to improve paragraph vector models for downstream healthcare-related natural language processing tasks like overpayment detection for claims data. For example, various embodiments may use a graph-regularized Distributed Memory Model of Paragraph Vectors (PV-DM) model that incorporates the ontology graph structure on a family of codes by using the intra-relations between nodes in each code family and inter-relations among code families, and use this structure to represent knowledge from the ontology and integrate a graph regularization to basic PV-DM model.

Various embodiments of the present invention further use a translation on hyperplanes (TransH) model. In some embodiments, a TransH model embeds both the code descriptions and relations in low-dimensional vector spaces.

This model may process the ontological graph structure on clinical codes as multi-relation data and integrates this extra knowledge from multi-relational data into a paragraph vector embedding to a generate vector representations for both code entities and relations. The TransH model may also capture the multi-relational structure of clinical codes as TransH interprets a relation as a translating operation on a hyperplane. Various embodiments of the present invention further use a loss function generation function that generates the loss function for generating the embedded representation vectors for codes as well as relations by combining the loss function due to using the combination of the PV-DM approach and the TransH approach. Aspects of techniques related to TansH are described in at least one of Bordes et al., *Translating Embeddings for Modeling Multi-relational Data* (2013), available online at https://dl.acm.org/doi/10.5555/2999792.2999923 and Wang et al., Knowledge Graph Embedding by Translating on Hyperplanes (2014), available online at https://dl.acm.org/doi/10.5555/2893873.2894046.

II. Definitions

The term "document representation" may refer to a data construct that is configured to describe a collective representation of a document data object comprising a group of words. In some embodiments, the document representation is an inferred representation of a document data object as determined using a document embedding generation routine, such as a paragraph-vector-based document embedding generation routine (e.g., a paragraph vector distributed memory routine, a skipgram-based paragraph vector routine, and/or the like). In some embodiments, in accordance with a paragraph-vector-based document embedding generation routine, a document representation for a corresponding document object is generated during an inference performed by the paragraph-vector-based document embedding generation routine based at least in part on a word detection (e.g., a missing word detection) task that is performed using a plurality of word vectors for a selected subset of the words in the corresponding document data object. For example, given a set of n words in a corresponding document data object, the paragraph-vector-based document embedding generation routine may be configured to determine the document representation for the corresponding document object as a paragraph vector that minimizes a probability of occurrence of word vectors for n–m of the words in corresponding document data object given the occurrence of word vectors form of the words in the corresponding data object (where the m word vectors may be determined during training of the paragraph-vector-based document embedding generation routine). Aspects of the paragraph vector distributed memory routine are described in Lee et al., *Distributed Representations of Sentences and Documents* (2014), available online at https://arxiv.org/pdf/1405.4053.pdf. However, while various embodiments of the present invention describe generating document representations using modifications to the paragraph vector distributed memory routine, a person of ordinary skill in the relevant technology will recognize that document representations may be generated based at least in part on making corresponding modifications to any document embedding generation routine, including any non-paragraph-vector-based document embedding generation routine as well as any paragraph-vector-based document embedding generation routine other than the paragraph vector distributed memory routine.

The term "word vector" may refer to a data construct that is configured to describe a representation of a word that can be used to generate document representations for documents within which the word occurs. As described above, in some embodiments, the word vectors for words may be determined during training of a document embedding generation routine, such as a paragraph-vector-based document embedding generation routine (e.g., a paragraph vector distributed memory routine, a skipgram-based paragraph vector routine, and/or the like). In some embodiments, in accordance with a paragraph-vector-based document embedding generation routine, during training of the paragraph-vector-based document embedding generation routine, word vectors are generated for words occurring in a document corpus and using a word detection (e.g., a missing word detection) task that is performed using a plurality of word vectors for a selected subset of the words in the corresponding document data object. In some embodiments, once generated, the word vectors are then used during inference of the paragraph-vector-based document embedding generation routine to generate paragraph vectors for document data objects in which the words occur. For example, given a set of n words in a corresponding document data object, the paragraph-vector-based document embedding generation routine may be configured to determine the document representation for the corresponding document object as a paragraph vector that minimizes a probability of occurrence of word vectors for n–m of the words in corresponding document data object given the occurrence of word vectors form of the words in the corresponding data object (where the m word vectors may be determined during training of the paragraph-vector-based document embedding generation routine).

The term "document data object" may refer to a data construct that is configured to describe a collection of text data that is associated with a set of relationships with a set of other document data objects in accordance with an ontology graph. An example of a document data object may be the collection of description text data associated with a particular code, such as the collection of text data associated with one of an International Classification of Diseases (ICD) code, a Current Procedural Terminology (CPT) code, a pharmacy code, a drug code, a clinical code, a service code, a provider code, a region code, and/or the like. The document data object may be associated with a set of relationships as defined by an ontology graph (e.g., defined by a document hierarchy, e.g., via an ontology graph or knowledge graph). For example, when a document data object is an ICD code, the ontology graph may describe the ICD code hierarchy that defines, for each pair of ICD codes, whether a first ICD code in the pair of ICD codes is deemed to be an nth level parent of a second ICD code in the pair of ICD codes. In some embodiments, two document data objects are deemed to have a positive relationship if their corresponding node representations in an ontology graph have a relationship that satisfies one or more defined relationship sufficiency criteria (e.g., a defined relationship criterion describing that two document data objects are deemed to have a positive relationship if one of the two document data objects is an nth level parent of the other document data object of the two document data objects according to the ontology graph). In some embodiments, two document data objects are deemed to have a negative relationship if their corresponding node representations in an ontology graph have a relationship that fail to satisfy one or more defined relationship sufficiency criteria (e.g., a defined relationship criterion describing that two document data objects are deemed to have a positive relationship if one of the two document data objects is an nth level parent of the other document data object of the two document data objects according to the ontology graph). In some embodiments, two document data objects are deemed to have a negative relationship if their corresponding node representations in an ontology graph do not have a positive relationship.

The term "ontology graph" may refer to a data construct that is configured to a set of relationships between a set of document data objects. For example, in some embodiments, an ontology graph defines a set of immediate children data objects for a parent data object. In some embodiments, by defining immediate parent-child relationships between a set of document data objects, the ontology graph describes nth level parent-child relationships between the set of document data objects, where a first document data object is an nth level parent of a second document data object if recursively traversing parent-child relationships upward from the second document data object will at some point reach the first document. An example of an ontology graph is the ICD code hierarchy that defines, for each pair of ICD codes, whether a first ICD code in the pair of ICD codes is deemed to be an nth level parent of a second ICD code in the pair of ICD codes. In some embodiments, the relationships defined by an ontology graph include positive relationships (e.g., parent-child relationships) and negative relationships (e.g., absence of parent child relationships). In some embodiments, two document data objects are deemed to have a positive relationship if their corresponding node representations in an ontology graph have a relationship that satisfies one or more defined relationship sufficiency criteria (e.g., a defined relationship criterion describing that two document data objects are deemed to have a positive relationship if one of the two document data objects shares a relationship with the other document data object, e.g., is an nth level parent of the other document data object of the two document data objects according to the ontology graph). In some embodiments, two document data objects are deemed to have a negative relationship if their corresponding node representations in an ontology graph have a relationship that fail to satisfy one or more defined relationship sufficiency criteria (e.g., a defined relationship criterion describing that two document data objects are deemed to have a positive relationship if one of the two document data objects shares a relationship with the other document data object, e.g., is an nth level parent of the other document data object of the two document data objects according to the ontology graph). In some embodiments, two document data objects are deemed to have a negative relationship if their corresponding node representations in an ontology graph do not have a positive relationship.

The term "graph-embedding-based paragraph vector machine learning model" may refer to a data construct that is configured to describe parameters, hyper-parameters, and/or defined operations of a machine learning model that is configured to process a set of word vectors for a document data object in order to generate: (i) a document representation of the document data object, and (ii) one or more relational representations for one or more relationships of the document data object as determined based at least in part on an ontology graph associated with the document data object. In some embodiments, the graph-embedding-based paraph vector machine learning model is configured to process a set of word vectors for a document data object and one or more relationships of the document data object as determined based at least in part on a document in order to generate: (i) a document representation of the document data object, and (ii) one or more relational representations for the one or more relationships of the document data object as determined based at least in part on an ontology graph associated with the document data object. In some embodiments, the graph-embedding-based paraph vector machine learning model is configured to optimize a textual-relational optimization output across a set of document data objects, where the textual-relational optimization output is the optimization term of the graph-embedding-based paraph vector machine learning model that is optimized (e.g., minimized, maximized, and/or the like) during an inference phase of the graph-embedding-based paraph vector machine learning model. In some of the noted embodiments, the textual-relational optimization output comprises a textual optimization sub-output and a relational optimization sub-output, where the textual optimization sub-output is generated based at least in part on the plurality of word vectors and the document representation, and the relational optimization sub-output is generated based at least in part on the document representation and the one or more relational representations. In some embodiments, the inputs to the graph-embedding-based paraph vector machine learning model include word vectors. In some embodiments, outputs of the graph-embedding-based paraph vector machine learning model include document representations of document data objects which may be vectors as well as relational representations which may each be a vector or a scalar weight value.

The term "textual-relational optimization output" may refer to a data construct that is configured to describe the output of a set of operations that are performed across a set of document data objects associated with an ontology graph as part of the operations of a graph-embedding-based paraph vector machine learning model. In some embodiments, the textual-relational optimization output is generated by summing a per-document textual-relational optimization output across a set of document data objects, where the per-document textual-relational optimization output is determined based at least in part on a textual optimization sub-output for the document data object and a relational optimization sub-output for the document data object. In some of the noted embodiments, the textual optimization sub-output for a particular document data object is generated based at least in part on a plurality of word vectors for the document data object. For example, in some embodiments, the textual optimization sub-output for a particular document data object may be determined based at least in part on an optimization term of an inference phase of a paragraph-vector-based document embedding generation routine, such as an optimization term that computes a probability of occurrence of word vectors for n-m of the words in corresponding document data object given the occurrence of word vectors for m of the words in the corresponding data object. In some embodiments, the relational optimization sub-output for a particular document data object is determined based at least in part on each weighted distance value for a secondary document object of the plurality of document objects other than the document object, where each weighted distance value is determined based at least in part on a distance value between a corresponding secondary document object and the document object as well as a relational representation for a relationship type of the secondary document object and the document object. In some embodiments, the relational optimization sub-output for a particular document data object is determined based at least in part on each positive distance measure for a positive relationship in a positive subset of the one or more relationships and each negative distance measure for a negative relationship in the negative subset of the one or more relationships, where each positive distance measure is a translational distance measure between: (i) a sum of: (a) a first document representation for a first document object associated with a corresponding positive relationship and the relational representation for the corresponding positive relationship, and (ii) a second document representation for a second document object associated with the corresponding positive relationship, and each negative distance measure is a translational distance measure between: (i) a sum of: (a) a first document representation for a first document object associated with a corresponding negative relationship and the relational representation for the corresponding negative relationship, and (ii) a second document representation for a second document object associated with the corresponding negative relationship.

The term "textual optimization sub-output" may refer to a data construct that is configured to describe a probability of occurrence of word vectors for n−m of the words in corresponding document data object given the occurrence of word vectors form of the words in the corresponding data object (where the m word vectors may be determined during training of the paragraph-vector-based document embedding generation routine). In some embodiments, the textual optimization sub-output is determined based at least in part on the optimization term of a paragraph vector document embedding routine (e.g., a distributed memory paragraph vector routine). In some embodiments, a textual optimization sub-output is determined based at least in part on the output of the equation $$\frac{1}{T}\sum_{t=1}^{T}((1-\lambda)\log p(w_t \mid w_{t-c}, \ldots, w_{t-1}, w_{t+1}, \ldots, w_{t+c}, d_k)),$$

where $\lambda$ is a tuned hyper-parameter that describes the relative importance of the relational optimization sub-output relative to the textual optimization sub-output, $d_k$ is the document representation for the target document data object, and $p(w_c \mid w_{t-c}, \ldots, w_{t-1}, w_{t+1}, \ldots, w_{t+c}, d_k)$ is the occurrence probability of the word vector $w_c$ given the context word vectors $w_{t-c}, \ldots, w_{t-1}, w_{t+1}, \ldots, w_{t+c}$ and the document representation $d_k$. In some embodiments, the textual optimization sub-output is determined based at least in part on the output of the equation $$\sum_{t=1}^{T}\frac{1}{|d_k|}((1-\lambda)\log p(w_t \mid w_{t-c}, \ldots, w_{t-1}, w_{t+1}, \ldots, w_{t+c}, d_k)),$$

where $\lambda$ is a tuned hyper-parameter that describes the relative importance of the relational optimization sub-output relative to the textual optimization sub-output, $d_k$ is the document representation for the target document data object, and $p(w_c \mid w_{t-c}, \ldots, w_{t-1}, w_{t+1}, \ldots, w_{t+c}, d_k)$ is the occurrence probability of the word vector $w_c$ given the context word vectors $w_{t-c}, \ldots, w_{t-1}, w_{t+1}, \ldots, w_{t+c}$ and the document representation $d_k$.

The term "relational optimization sub-output" may refer to a data construct that is configured to describe a measure of contribution of relationships of a document data object to an overall representation of the document data object. In some embodiments, the relational optimization sub-output describes the output of the optimization term of a translation graph embedding model, such as the optimization term of TransH (translation on hyperplanes), TransE, and/or other translational models), and/or the like. Aspects of translational models are described in Bordes et al., *Translating Embeddings for Modeling Multi-relational Data* (2013), available online at https://dl.acm.org/doi/10.5555/2999792.2999923. In some embodiments, the relational optimization sub-output is determined based at least in part on the output of the equation $[\lambda\Sigma_{r=1}^{R}(\mu_{kr}f(d_k,d_r)-x_{int}(\mu_{kr}'f(d_k,d_r'))-x_{ext}(\mu'_{kr}f(d_k,d_r))]_+$, where $d_k$ is the document representation for the target document data object, r is an index variable that iterates over the set of positive and negative relationships for the target document data object as defined by an ontology graph, R is the set of positive and negative relationships for the target document data object as defined by an ontology graph, $\mu_{kr}$ is the weight assigned to a relationship between the target document data object and an rth document data object, r' describes a document data object that is not the rth document data object and is randomly selected from R, $\mu_{kr}$ is the weight assigned to a positive relationship between the target document data object and r', $\mu_{kr}$ is the weight assigned to a negative relationship between the target document data object and r', $x_{ext}$ is a function that returns a one value if the relationship between the target document data object and r' is negative and zero otherwise, $x_{int}$ is a function that returns a one value if the relationship between the target document data object and r' is an internal relationship and zero otherwise, $d_r$ is the document representation for the rth document data object, $d_{r'}$ is the document representation for r', $[x]_+$ describes a positive part of x, f(x,y) describes a dissimilarity measure (e.g., $\ell_1$-norm/Manhattan Distance, $\ell_2$-norm/Euclidean distance, and/or the like) of latent representations of x and y in a multi-dimensional embedding space. In some embodiments, the relational optimization sub-output is determined based at least in part on the output of the equation $$\left(\lambda\sum_{(d_k,r,d_t)\in\Delta,(d_{k'},r,d_t')\in\Delta'}[\gamma+f(d_k,r,d_t)-f(d_k,r,d_t')]_+\right),$$

where $d_k$ is the document representation for the target document data object, $(d_k, r, d_t)$ is a triplet describing a positive relationship r as well as the document representation $d_k$ for the target document data object and the document representation for a selected document data object t (over which the second summation may iterate), $(d_k, r, d'_t)$ is a triplet describing a negative relationship r as well as two document representations in a document pair that excludes at least one of the target document data object and t, $\Delta$ is the set of triplets (i.e., the set of golden triplets) each describing a positive relationship between a pair of document data objects as well as the document representations for the pair of document data objects, $\Delta'$ is the set of triplets (i.e., the set of false triplets) each describing a negative relationship between a pair of document data objects as well as the document representations for the pair of document data objects, $[x]_+$ describes a positive part of x, and f(x,y) describes a dissimilarity measure (e.g., $\ell_1$-norm/Manhattan distance, $\ell_2$-norm/Euclidean distance and/or the like) of vector representations of x and y in a multi-dimensional embedding space.

The terms "internal relationship" or "internal relation" may refer to a data construct that is configured to describe a relationship occurring inside a cluster of document representations (e.g., a cluster of documents representations associated with a cluster of codes). In some embodiments, an internal relationship is a relationship occurring inside a cluster of codes. In some embodiments, a cluster of codes is a group of codes that are deemed related to each other, such as an International Classification of Diseases, Tenth Revision, Clinical Modification (ICD-10-CM) tree hierarchy, a ICD-10 Procedure Coding System (ICD-10-PCS) graph, a SNOMED graph, and/or the like. In some embodiments, a cluster of document representations is a group of document representations that are deemed related to each other, e.g., a group of document representations that are deemed related to each other because they are collectively associated with a cluster of codes.

The terms "external relationship" or "external relation" may refer to a data construct that is configured to describe a relationship between a first document representation (e.g., that is associated with a first code) in a first cluster of document representations (e.g., a first cluster of documents representations associated with a first cluster of codes) and a second document representation (e.g., that is associated with a second code) in a second cluster of document representations (e.g., a second cluster of documents representations associated with a second cluster of codes). In some embodiments, an external relationship is a relation that links one node in a cluster of codes with another node in another cluster of codes.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating fraud, waste, and abuse (FWA) scores for patients/providers based at least in part one or more clinical codes associated with medical claims pertaining to each of the noted patients/providers.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

FIG. 4 is a flowchart diagram of an example process 400 for determining a document representation for a document data object. Via the various embodiments of the process 400, the predictive data analysis computing entity 106 can generate efficient and reliable document representations based at least in part on both textual data associated with the document data object as well as relationships of the document data object with other document data objects.

The process 400 begins at step/operation 401 when the predictive data analysis computing entity 106 identifies one or more word vectors associated with the document data object. In some embodiments, the predictive data analysis computing entity 106 identifies one or more words that appear in the document data object, and then retrieves the word vector for each word as determined based at least in part on training results of a graph-embedding-based paragraph vector machine learning model, as further described below.

In some embodiments, word vector is a fixed-size representation of a word that can be used to generate document representations for documents within which the word occurs. As described above, in some embodiments, the word vectors for words may be determined during training of a document embedding generation routine, such as a paragraph-vector-based document embedding generation routine (e.g., a paragraph vector distributed memory routine, a skipgram-based paragraph vector routine, and/or the like). In some embodiments, in accordance with a paragraph-vector-based document embedding generation routine, during training of the paragraph-vector-based document embedding generation routine, word vectors are generated for words occurring in a document corpus and using a word detection (e.g., a missing word detection) task that is performed using a plurality of word vectors for a selected subset of the words in the corresponding document data object. In some embodiments, once generated, the word vectors are then used during inference of the paragraph-vector-based document embedding generation routine to generate paragraph vectors for document data objects in which the words occur. For example, given a set of n words in a corresponding document data object, the paragraph-vector-based document embedding generation routine may be configured to determine the document representation for the corresponding document data object as a paragraph vector that minimizes a probability of occurrence of word vectors for n–m of the words in corresponding document data object given the occurrence of word vectors form of the words in the corresponding data object (where the m word vectors may be determined during training of the paragraph-vector-based document embedding generation routine).

In some embodiments, word vectors of a document data object describe at least a subset of the words that appear in the document data object, for example the subset of non-stop words that appear in the document data object. In some embodiments, the document data object comprises a collection of text data that is associated with a set of relationships with a set of other document data objects in accordance with an ontology graph. An example of a document data object may be the collection of text data associated with a particular code, such as the collection of text data associated with one of an International Classification of Diseases (ICD) code, a Current Procedural Terminology (CPT) code, a pharmacy code, a drug code, a clinical code, a service code, a provider code, a region code, and/or the like. The document data object may be associated with a set of relationships as defined by an ontology graph. For example, when a document data object is an ICD code, the ontology graph may describe the ICD code hierarchy that defines, for each pair of ICD codes, whether a first ICD code in the pair of ICD codes is deemed to be an nth level parent of a second ICD code in the pair of ICD codes. In some embodiments, two document data objects are deemed to have a positive relationship if their corresponding node representations in an ontology graph have a relationship that satisfies one or more defined relationship sufficiency criteria (e.g., a defined relationship criterion describing that two document data objects are deemed to have a positive relationship if one of the two document data objects is an nth level parent of the other document data object of the two document data objects according to the ontology graph). In some embodiments, two document data objects are deemed to have a negative relationship if their corresponding node representations in an ontology graph have a relationship that fail to satisfy one or more defined relationship sufficiency criteria (e.g., a defined relationship criterion describing that two document data objects are deemed to have a positive relationship if one of the two document data objects is an nth level parent of the other document data object of the two document data objects according to the ontology graph).

At step/operation 402, the predictive data analysis computing entity 106 identifies one or more relationships of the document data object as determined based at least in part on an ontology graph. In some embodiments, the ontology graph describes positive and negative relationships of the document data object, and the noted positive and negative relationships are used as an input to a graph-embedding-based paragraph vector machine learning model to generate the document representation and one or more relational representations for the one or more relationships of the document data object, as further described below.

In some embodiments, the ontology graph comprises a set of relationships between a set of document data objects. For example, in some embodiments, an ontology graph defines a set of immediate children data objects for a parent data object. In some embodiments, by defining immediate parent-child relationships between a set of document data objects, the ontology graph describes nth level parent-child relationships between the set of document data objects, where a first document data object is an nth level parent of a second document data object if recursively traversing parent-child relationships upward from the second document data object will at some point reach the first document. An example of an ontology graph is the ICD code hierarchy that defines, for each pair of ICD codes, whether a first ICD code in the pair of ICD codes is deemed to be an nth level parent of a second ICD code in the pair of ICD codes. In some embodiments, the relationships defined by an ontology graph include positive relationships (e.g., parent-child relationships) and negative relationships (e.g., absence of parent child relationships). In some embodiments, two document data objects are deemed to have a positive relationship if their corresponding node representations in an ontology graph have a relationship that satisfies one or more defined relationship sufficiency criteria (e.g., a defined relationship criterion describing that two document data objects are deemed to have a positive relationship if one of the two document data objects is an nth level parent of the other document data object of the two document data objects according to the ontology graph). In some embodiments, two document data objects are deemed to have a negative relationship if their corresponding node representations in an ontology graph have a relationship that fail to satisfy one or more defined relationship sufficiency criteria (e.g., a defined relationship criterion describing that two document data objects are deemed to have a positive relationship if one of the two documents share a relationship with the other document data object of the two document objects).

An operational example of an ontology graph 500 is depicted in FIG. 5. As depicted in FIG. 5, each document data object associated with the ontology graph 500 is associated with a node. In some embodiments, presence of an edge between two nodes describes a positive relationship between the document data objects associated with the two nodes, while absence of an edge between two nodes describes a negative relationship between the document data objects associated with the two nodes. In some embodiments, when the two nodes associated with two document data objects that have an edge belong to a single cluster of nodes, the positive relationship between the two document data objects is deemed to be an internal positive relationship. In some embodiments, when the two nodes associated with two document data objects that have an edge belong to two different clusters of nodes, the positive relationship between the two document data objects is deemed to be an external positive relationship.

Returning to FIG. 4, at step/operation 403, the predictive data analysis computing entity 106 determines, based at least in part on the plurality of word vectors and the one or more relationships, and using a graph-embedding-based paragraph vector machine learning model, the document representation for the document data object and one or more relational representations for the one or more relationships of the document data object as determined based at least in part on the ontology graph described above. In some embodiments, the predictive data analysis computing entity 106 processes the plurality of word vectors and the one or more relationships using the graph-embedding-based paragraph vector machine learning model to generate the document representation and one or more relational representations for the one or more relationships.

In some embodiments, the graph-embedding-based paragraph vector machine learning model is configured to describe parameters, hyper-parameters, and/or defined operations of a machine learning model that is configured to process a set of word vectors for a document data object in order to generate: (i) a document representation of the document data object, and (ii) one or more relational representations for one or more relationships of the document data object as determined based at least in part on an ontology graph associated with the document data object. In some embodiments, the graph-embedding-based paraph vector machine learning model is configured to process a set of word vectors for a document data object and one or more relationships of the document data object as determined based at least in part on a document in order to generate: (i) a document representation of the document data object, and (ii) one or more relational representations for the one or more relationships of the document data object as determined based at least in part on an ontology graph associated with the document data object. In some embodiments, the graph-embedding-based paraph vector machine learning model is configured to optimize a textual-relational optimization output across a set of document data objects, where the textual-relational optimization output is the optimization term of the graph-embedding-based paraph vector machine learning model that is optimized (e.g., minimized, maximized, and/or the like) during an inference phase of the graph-embedding-based paraph vector machine learning model. In some of the noted embodiments, the textual-relational optimization output comprises a textual optimization sub-output and a relational optimization sub-output, where the textual optimization sub-output is generated based at least in part on the plurality of word vectors and the document representation, and the relational optimization sub-output is generated based at least in part on the document representation and the one or more relational representations.

In some embodiments, the graph-embedding-based paragraph vector machine learning model is configured to perform the operations of the below equation:

$$\min\left(\frac{1}{T}\sum_{t=1}^{T}((1-\lambda)\log p(w_t \mid w_{t-c}, \ldots, w_{t-1}, w_{t+1}, \ldots, w_{t+c}, d_k))\right) + \left[\lambda \sum_{r=1}^{R}(\mu_{kr} f(d_k, d_r) - x_{int}(\mu_{kr'} f(d_k, d_{r'})) - x_{ext}(u'_{kr} f(d_k, d_r))]_{+}\right] \quad \text{Equation 1}$$

In Equation 1: (a)

$$\frac{1}{T}\sum_{t=1}^{T}((1-\lambda)\log p(w_t \mid w_{t-c}, \ldots, w_{t-1}, w_{t+1}, \ldots, w_{t+c}, d_k)) + \left[\lambda \sum_{r=1}^{R}(\mu_{kr} f(d_k, d_r) - x_{int}(\mu_{kr'} f(d_k, d_{r'})) - x_{ext}(u'_{kr} f(d_k, d_r))\right]_{+}$$

is the textual-relational optimization output, (b)

$$\frac{1}{T}\sum_{t=1}^{T}((1-\lambda)\log p(w_t \mid w_{t-c}, \ldots, w_{t-1}, w_{t+1}, \ldots, w_{t+c}, d_k))$$

is the textual optimization sub-output, (c)

$$\left[\lambda \sum_{r=1}^{R}(\mu_{kr} f(d_k, d_r) - x_{int}(\mu_{kr'} f(d_k, d'_r)) - x_{ext}(u'_{kr} f(d_k, d_r))\right]_{+}$$

is the relational optimization sub-output, (d) t is an index variable that iterates over the set of word vectors associated with a document data object, (e) $\lambda$ is a tuned hyper-parameter (e.g., having a value between one and zero) that describes the relative importance of the relational optimization sub-output relative to the textual optimization sub-output, (f) $d_k$ is the document representation for the target document data object (g) $p(w_c \mid w_{t-c}, \ldots, w_{t-1}, w_{t+1}, \ldots, w_{t+c}, d_k)$ is the occurrence probability of the word vector $w_c$ given the context word vectors $w_{t-c}, \ldots, w_{t-1}, w_{t+1}, \ldots, w_{t+c}$ and the document representation $d_k$, (h) r is an index variable that iterates over the set of positive and negative relationships for the target document data object as defined by an ontology graph, (i) R is the set of positive and negative relationships for the target document data object as defined by an ontology graph, (j) $\mu_{kr}$ is the weight assigned to a relationship between the target document data object and an rth document data object, (k) r' describes a document data object that is not the rth document data object and is randomly selected from R, (l) $\mu_{kr'}$ is the weight assigned to a positive relationship between the target document data object and r', (m) $\mu'_{kr'}$ is the weight assigned to a negative relationship between the target document data object and r', (n) $x_{ext}$ is a function that returns a one value if the relationship between the target document data object and r' is negative and zero otherwise, (o) $x_{int}$ is a function that returns a one value if the relationship between the target document data object and r' is positive and zero otherwise, (p) $d_r$ is the document representation for the rth document data object, (q) $d_{r'}$ is the document representation for r', (s) $[x]_+$ describes a positive part of x, and (t) f(x,y) describes a dissimilarity measure (e.g., $\ell_1$ norm/Manhattan distance, $\ell_2$ norm/Euclidean distance, and/or the like) of latent representations of x and y in a multi-dimensional embedding space. In some embodiments, in the graph-embedding-based paragraph vector machine learning model of Equation 1, the relational representations (e.g., at least one of $\mu_{kr}$, $\mu_{kr'}$, and $\mu'_{kr}$) are an inferred scalar weight value for a relationship of the one or more relationships between the document data object and a secondary document data object of the one or more secondary document data objects that are determined by optimization of the textual-relational optimization output.

In some embodiments, the graph-embedding-based paragraph vector machine learning model is configured to perform the operations of the below equation:

$$\min\left(\sum_{t=1}^{T}\frac{1}{|d_k|}((1-\lambda)\log p(w_t \mid w_{t-c}, \ldots, w_{t-1}, w_{t+1}, \ldots, w_{t+c}, d_k))\right) + \left(\lambda \sum_{(d_k,r,d_t)\in\Delta,(d_{k'},r,d'_t)\in\Delta'} [\gamma + f(d_k + r, d_t) - f(d_{k'} + r, d'_t)]_+\right)$$

Equation 2

In Equation 2: (a)

$$\left(\sum_{t=1}^{T}\frac{1}{|d_k|}((1-\lambda)\log p(w_t \mid w_{t-c}, \ldots, w_{t-1}, w_{t+1}, \ldots, w_{t+c}, d_k))\right) + \left(\lambda \sum_{(d_k,r,d_t)\in\Delta,(d_{k'},r,d'_t)\in\Delta'} [\gamma + f(d_k, r, d_t) - f(d_{k'}, r, d'_t)]_+\right)$$

is the textual-relational optimization output, (b)

$$\left(\sum_{t=1}^{T}\frac{1}{|d_k|}((1-\lambda)\log p(w_t \mid w_{t-c}, \ldots, w_{t-1}, w_{t+1}, \ldots, w_{t+c}, d_k))\right)$$

is the textual optimization sub-output, (c)

$$\left(\lambda \sum_{(d_k,r,d_t)\in\Delta,(d_{k'},r,d'_t)\in\Delta'} [\gamma + f(d_k, r, d_t) - f(d_{k'}, r, d'_t)]_+\right)$$

is the relational optimization sub-output, (d) t is an index variable that iterates over the set of word vectors associated with a document data object, (e) $\lambda$ (e.g., having a value between one and zero) is a tuned hyper-parameter that describes the relative importance of the relational optimization sub-output relative to the textual optimization sub-output, (f) $d_k$ is the document representation for the target document data object, (g) $p(w_c | w_{t-c}, \ldots, w_{t-1}, w_{t+1}, \ldots, w_{t+c}, d_k)$ is the occurrence probability of the word vector $w_c$ given the context word vectors $w_{t-c}, \ldots, w_{t-1}, w_{t+1}, \ldots, w_{t+c}$ and the document representation $d_k$, (f) $(d_k, r, d_t)$ is a triplet describing a positive relationship r as well as the document representation $d_k$ for the target document data object and the document representation $d_t$ for a selected document data object t (over which the second summation may iterate), (g) $(d_{k'}, r, d_t')$ is a triplet describing a negative relationship r as well as two document representations in a document pair that excludes at least one of the target document data object and t, (h) $\Delta$ is the set of triplets (i.e., the set of golden triplets) each describing a positive relationship between a pair of document data objects as well as the document representations for the pair of document data objects, (i) $\Delta'$ is the set of negative triplets (i.e., the set of false triplets) each describing a negative relationship between a pair of document data objects as well as the document representations for the pair of document data objects, (j) $[x]_+$ describes a positive part of x, and (k) f(x,y) describes a dissimilarity measure (e.g., $\ell_1$ norm/Manhattan distance, $\ell_2$ norm/Euclidean distance, and/or the like) of vector representations of x and y in a multi-dimensional embedding space. In some embodiments, in the graph-embedding-based paragraph vector machine learning model of Equation 2, each relational representation (e.g., each r value) is an inferred vector representation for a relationship of the one or more relationships between the document data object and the secondary document data object of the document data objects described by the ontology graph that are determined by optimizing the textual-relational optimization output. In some embodiments, in the graph-embedding-based paragraph vector machine learning model of Equation 2, each document representation is an inferred vector representation that is determined by optimizing the textual-relational optimization output.

In some embodiments, step/operation 403 can be performed in accordance with the process that is depicted in FIG. 6. The process that is depicted in FIG. 6 begins at step/operation 601 when the predictive data analysis computing entity 106 determines a textual optimization sub-output. In some embodiments, the textual optimization sub-output describes a value that describes a probability of occurrence of word vectors for n−m of the words in corresponding document data object given the occurrence of word vectors for m of the words in the corresponding data object (where the m word vectors may be determined during training of the paragraph-vector-based document embedding generation routine). In some embodiments, the textual optimization sub-output is determined based at least in part on the optimization term of a paragraph vector document embedding routine (e.g., a distributed memory paragraph vector routine). In some embodiments, a textual optimization sub-output is determined based at least in part on the output of the equation $$\frac{1}{T}\sum_{t=1}^{T}((1-\lambda)\log p(w_t \mid w_{t-c}, \ldots, w_{t-1}, w_{t+1}, \ldots, w_{t+c}, d_k)),$$

where $\lambda$ is a tuned hyper-parameter that describes the relative importance of the relational optimization sub-output relative to the textual optimization sub-output, $d_k$ is the document representation for the target document data object, and $p(w_c | w_{t-c}, \ldots, w_{t-1}, w_{t+1}, \ldots, w_{t+c}, d_k)$ is the occurrence probability of the word vector $w_c$ given the context word vectors $w_{t-c}, \ldots, w_{t-1}, w_{t+1}, \ldots, w_{t+c}$ and the document representation $d_k$. In some embodiments, the textual optimization sub-output is determined based at least in part on the output of the equation $$\left(\sum_{t=1}^{T}\frac{1}{|d_k|}((1-\lambda)\log p(w_t \mid w_{t-c}, \ldots, w_{t-1}, w_{t+1}, \ldots, w_{t+c}, d_k))\right),$$

where $\lambda$ is a tuned hyper-parameter that describes the relative importance of the relational optimization sub-output relative to the textual optimization sub-output, $d_k$ is the document representation for the target document data object, and $p(w_c|w_{t-c}, \ldots, w_{t-1}, w_{t+1}, \ldots w_{t+c}, d_k)$ is the occurrence probability of the word vector $w_c$ given the context word vectors $w_{t-c}, \ldots, w_{t-1}, w_{t+1}, \ldots, w_{t+c}$ and the document representation $d_k$.

At step/operation 602, the predictive data analysis computing entity 106 determines a relational optimization sub-output. In some embodiments, the relational optimization sub-output describes a measure of contribution of relationships of a document data object to an overall representation of the document data object. In some embodiments, the relational optimization sub-output describes the output of the optimization term of a translation graph embedding model, such as the optimization term of TransH (translation on hyperplanes), TransE, and/or other translational models, and/or the like. Aspects of translational models are described in Bordes et al., *Translating Embeddings for Modeling Multi-relational Data* (2013), available online at https://dl.acm.org/doi/10.5555/2999792.2999923. In some embodiments, the relational optimization sub-output is determined based at least in part on the output of the equation $[\lambda\Sigma_{r=1}^{R}(\mu_{kr}f(d_k,d_r)-x_{int}(\mu_{kr}'f(d_k,d_{r'}))-x_{ext}(\mu'd_r f(d_k,d_r))]_+$, where $d_k$ is the document representation for the target document data object, r is an index variable that iterates over the set of positive and negative relationships for the target document data object as defined by an ontology graph, R is the set of positive and negative relationships for the target document data object as defined by an ontology graph, $\mu_{kr}$ is the weight assigned to a relationship between the target kth document data object and an rth document data object, r' describes a document data object that is not the rth document data object and is randomly selected from R, $\mu_{kr}$, is the weight assigned to a positive relationship between the target document data object and r', $\mu'_{kr}$, is the weight assigned to a negative relationship between the target document data object and r' $x_{ext}$ is a function that returns a one value if the relationship between the target document data object and r' is negative and zero otherwise, $x_{int}$ is a function that returns a one value if the relationship between the target document data object and r' is positive and zero otherwise, $d_r$ is the document representation for the rth document data object, $d_{r'}$ is the document representation for r' $[x]_+$ describes a positive part of x,f(x,y) describes a dissimilarity measure (e.g., $\ell_1$ norm/Manhattan distance, $\ell_2$ norm/Euclidean distance, and/or the like) of latent representations of x and y in a multi-dimensional embedding space. In some embodiments, the relational optimization sub-output is determined based at least in part on the output of the equation $(\lambda\Sigma_{(d_k,r,d_t)\in\Delta,\ (d_k',r,d_t')\in\Delta'}[\gamma+f(d_k,r,d_t)-f(d_k,r,d_t')]_+)$, where $d_k$ is the document representation for the target document data object, $(d_k, r, d_t)$ is a triplet describing a positive relationship r as well as the document representation $d_k$ for the target document data object and the document representation for a selected document data object t (over which the second summation may iterate), $(d_k, r, d_t)$ is a triplet describing a negative relationship r as well as two document representations in a document pair that excludes at least one of the target document data object and t, $\Delta$ is the set of triplets (i.e., the set of golden triplets) each describing a positive relationship between a pair of document data objects as well as the document representations for the pair of document data objects, $\Delta'$ is the set of triplets (i.e., the set of false triplets) each describing a negative relationship between a pair of document data objects as well as the document representations for the pair of document data objects, $[x]_+$ describes a positive part of x, and f(x,y) describes a dissimilarity measure (e.g., $\ell_1$ norm/Manhattan distance, $\ell_2$ norm/Euclidean distance, and/or the like) of vector representations of x and y in a multi-dimensional embedding space.

At step/operation 603, the predictive data analysis computing entity 106 combines (e.g., aggregates) the textual optimization sub-output and the relational optimization sub-output to generate the textual-relational optimization output. In some embodiments, the textual-relational optimization output is the output of a set of operations that are performed across a set of document data objects associated with an ontology graph as part of the operations of a graph-embedding-based graph vector machine learning model. In some embodiments, the textual-relational optimization output is generated by summing a per-document textual-relational optimization output across a set of document data objects, where the per-document textual-relational optimization output is determined based at least in part on a textual optimization sub-output for the document data object and a relational optimization sub-output for the document data object. In some of the noted embodiments, the textual optimization sub-output for a particular document data object is generated based at least in part on a plurality of word vectors for the document data object. For example, in some embodiments, the textual optimization sub-output for a particular document data object may be determined based at least in part on an optimization term of an inference phase of a paragraph-vector-based document embedding generation routine, such as an optimization term that computes a probability of occurrence of word vectors for n−m of the words in corresponding document data object given the occurrence of word vectors for m of the words in the corresponding data object.

In some embodiments, the relational optimization sub-output for a particular document data object is determined based at least in part on each weighted distance value for a secondary document object of the plurality of document objects other than the document object, where each weighted distance value is determined based at least in part on a distance value between a corresponding secondary document object and the document object as well as a relational representation for a relationship type of the secondary document object and the document object. In some embodiments, the relational optimization sub-output for a particular document data object is determined based at least in part on each positive distance measure for a positive relationship in a positive subset of the one or more relationships and each negative distance measure for a negative relationship in the negative subset of the one or more relationships, where each positive distance measure is a translational distance measure between: (i) a sum of: (a) a first document representation for a first document object associated with a corresponding positive relationship and the relational representation for the corresponding positive relationship, and (ii) a second document representation for a second document object associated with the corresponding positive relationship, and each negative distance measure is a translational distance measure between: (i) a sum of: (a) a first document representation for a first document object associated with a corresponding negative relationship and the relational representation for the corresponding negative relationship, and (ii) a second document representation for a second document object associated with the corresponding negative relationship.

At step/operation 604, the predictive data analysis computing entity 106 determines the document representation for the document data object and one or more relational representations for the one or more relationships of the document data object based at least in part on the textual-relational optimization output. In some embodiments, the predictive data analysis computing entity 106 determines the document representation for the document data object and one or more relational representations in a manner that is configured to optimize the textual-relational optimization output.

By using the above techniques, various embodiments of the present invention introduce techniques for training graph-embedding-based document embedding generation that can integrate graph-based inferences into the predictions performed by the graph-embedding-based document embedding generation machine learning models without incurring extensive computational cost and storage resources to train the noted graph-embedding-based document embedding generation machine learning models. In this way, various embodiments of the present invention improve computational efficiency and storage efficiency of performing predictive data analysis on hierarchical document data objects and make important technical contributions to the field of predictive data analysis.

For example, various embodiments of the present invention introduce graph-embedding-based distributed memory paragraph vector machine learning models that can be trained only to detect word embeddings. Once training is accomplished, the word vectors can be used as part of a textual-relational optimization relationship to determine document embeddings and relationship embeddings. In this way, the introduced graph-embedding-based distributed memory paragraph vector machine learning models have a limited number of trainable parameters and training objectives, a feature that in turn makes training of such models more computationally efficient and storage-wise efficient. Accordingly, various embodiments of the present invention improve computational efficiency and storage efficiency of performing predictive data analysis on hierarchical document data objects and make important technical contributions to the field of predictive data analysis.

Returning to FIG. 4, at step/operation 404, the predictive data analysis computing entity 106 performs one or more prediction-based actions based at least in part on at least one of the document representation for the document data object and one or more relational representations for the one or more relationships of the document data object. In some embodiments, the predictive data analysis computing entity 106 generates a document embedding based at least in part on at least one of the document representation for the document data object and one or more relational representations for the one or more relationships of the document data object. In some of the noted embodiments, the predictive data analysis computing entity 106 processes the document embedding using a classification or regression machine learning model in order to generate a prediction related to the document data object. In some embodiments, the predictive data analysis computing entity 106 performs one or more prediction-based actions based at least in part on the prediction. Examples of prediction-based actions include generating notifications, automatically scheduling appointments, automatically generating prescriptions, automatically generating patient alerts, automatically generating physician alerts, and/or the like.

In some embodiments, the predictive data analysis computing entity 106 causes display of a prediction output user interface that displays one or more predictions generated based at least in part on document embeddings. For example, in some embodiments, the predictive data analysis computing entity 106 processes one or more document embeddings for one or more medical claims associated with a patient predictive data entity, where each medical claim is associated with a set of clinical codes (e.g., a set of ICD codes). In some of the noted embodiments, the predictive data analysis computing entity 106 generates predictions based at least in part on document embeddings associated with the clinical codes that relate to medical claims of the patient data entity and causes display of a prediction output user interface that displays the noted generated predictions.

For example, in some embodiments, the predictive data analysis computing entity 106 generates one or more predictions about whether a patient (or a provider) is engaging in fraud, waste, or abuse (FWA) based at least in part on clinical codes associated with the patient and causes display of a prediction output user interface that displays the noted generated predictions about FWA scores of patients (or providers). An operational example of such a prediction output user interface 700 is depicted in FIG. 7. As depicted in FIG. 7, the prediction output user interface 700 describes the clinical codes and the predicted FWA score for each patient, where the predicted FWA score for a particular patient may be determined based at least in part on processing document embeddings associated with the clinical code descriptions for the clinical codes associated with the corresponding patient.

Thus, as described in greater detail above, various embodiments of the present invention introduce techniques for training graph-embedding-based document embedding generation that can integrate graph-based inferences into the predictions performed by the graph-embedding-based document embedding generation machine learning models without incurring extensive computational cost and storage resources to train the noted graph-embedding-based document embedding generation machine learning models. In this way, various embodiments of the present invention improve computational efficiency and storage efficiency of performing predictive data analysis on hierarchical document data objects and make important technical contributions to the field of predictive data analysis.

For example, various embodiments of the present invention introduce graph-embedding-based distributed memory paragraph vector machine learning models that can be trained only to detect word embeddings. Once training is accomplished, the word vectors can be used as part of a textual-relational optimization relationship to determine document embeddings and relationship embeddings. In this way, the introduced graph-embedding-based distributed memory paragraph vector machine learning models have a limited number of trainable parameters and training objectives, a feature that in turn makes training of such models more computationally efficient and storage-wise efficient. Accordingly, various embodiments of the present invention improve computational efficiency and storage efficiency of performing predictive data analysis on hierarchical document data objects and make important technical contributions to the field of predictive data analysis.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
    identifying, by one or more processors, a plurality of word vectors associated with a document data object characterized by an ontology graph;
    identifying, by the one or more processors, one or more relationships of the document data object based at least in part on the ontology graph;
    generating, by the one or more processors and using a graph-embedding-based paragraph vector machine learning model, a document representation and one or more relational representations for the one or more relationships based at least in part on the plurality of word vectors and the one or more relationships, wherein:
        the graph-embedding-based paragraph vector machine learning model is configured to optimize a textual-relational optimization output that comprises a textual optimization sub-output and a relational optimization sub-output,
        the textual optimization sub-output is generated based at least in part on (a) the plurality of word vectors, (b) the document representation, and (c) a weighted distance value for a secondary document data object of a plurality of document data objects other than the document data object,
        the weighted distance value is determined based at least in part on (a) a distance value between the document data object and the secondary document data object and (b) a relational representation for a relationship type of the secondary document data object and the document data object, and
        the relational optimization sub-output is generated based at least in part on the document representation and the one or more relational representations; and
    initiating, by the one or more processors, the performance of one or more prediction-based actions based at least in part on at least one of the document representation or the one or more relational representations.

2. The computer-implemented method of claim 1, wherein the one or more relational representations comprise:
    for the secondary document data object, an inferred scalar weight value for a relationship of the one or more relationships between the document data object and the secondary document data object.

3. The computer-implemented method of claim 1, wherein the one or more relational representations comprise:
    for the secondary document data object, an inferred vector representation for a relationship of the one or more relationships between the document data object and the secondary document data object.

4. The computer-implemented method of claim 1, wherein the textual optimization sub-output is generated based at least in part on an occurrence probability for an inferred word vector of the plurality of word vectors given a context word vector subset of the plurality of word vectors and the document representation.

5. The computer-implemented method of claim 1, wherein the relational optimization sub-output is generated based at least in part on a positive distance measure for a positive relationship in a positive subset of the one or more relationships and a negative distance measure for a negative relationship in a negative subset of the one or more relationships.

6. The computer-implemented method of claim 5, wherein the positive relationship is associated with a document data object pair from the plurality of document data objects connected in the ontology graph.

7. The computer-implemented method of claim 5, wherein a particular negative relationship is associated with a document data object pair from the plurality of document data objects not connected in the ontology graph.

8. The computer-implemented method of claim 5, wherein the positive distance measure is a translational distance measure between: (i) a sum of: (a) a first document representation for a first document data object associated with the positive relationship and a relational representation for the positive relationship, and (ii) a second document representation for a second document data object associated with the positive relationship.

9. The computer-implemented method of claim 5, wherein the negative distance measure is a translational distance measure between: (i) a sum of: (a) a first document representation for a first document data object associated with the negative relationship and a relational representation for the negative relationship, and (ii) a second document representation for a second document data object associated with the negative relationship.

10. An apparatus comprising one or more processors and memory including program code, the memory and the program code configured to, with the one or more processors, cause the apparatus to at least:
    identify a plurality of word vectors associated with a document data object characterized by an ontology graph;
    identify one or more relationships of the document data object based at least in part on the ontology graph;
    generate, using a graph-embedding-based paragraph vector machine learning model, a document representation and one or more relational representations for the one or more relationships based at least in part on the plurality of word vectors and the one or more relationships, wherein:
        the graph-embedding-based paragraph vector machine learning model is configured to optimize a textual-relational optimization output that comprises a textual optimization sub-output and a relational optimization sub-output,
        the textual optimization sub-output is generated based at least in part on (a) the plurality of word vectors, (b) the document representation, and (c) a weighted distance value for a secondary document data object of a plurality of document data objects other than the document data object,
        the weighted distance value is determined based at least in part on (a) a distance value between the document data object and the secondary document data object and (b) a relational representation for a relationship type of the secondary document data object and the document data object, and the relational optimization sub-output is generated based at least in part on the document representation and the one or more relational representations; and perform one or more prediction-based actions based at least in part on at least one of the document representation and the one or more relational representations.

11. The apparatus of claim 10, wherein the one or more relational representations comprise:

for the secondary document data object, an inferred scalar weight value for a relationship of the one or more relationships between the document data object and the secondary document data object.

12. The apparatus of claim 10, wherein the one or more relational representations comprise:

for the secondary document data object, an inferred vector representation for a relationship of the one or more relationships between the document data object and the secondary document data object.

13. The apparatus of claim 10, wherein the textual optimization sub-output is generated based at least in part on an occurrence probability for an inferred word vector of the plurality of word vectors given a context word vector subset of the plurality of word vectors and the document representation.

14. The apparatus of claim 10, wherein the relational optimization sub-output is generated based at least in part on a positive distance measure for a positive relationship in a positive subset of the one or more relationships and a negative distance measure for a negative relationship in a negative subset of the one or more relationships.

15. The apparatus of claim 14, wherein the positive relationship is associated with a document data object pair from the plurality of document data objects connected in the ontology graph.

16. The apparatus of claim 14, wherein a particular negative relationship is associated with a document data object pair from the plurality of document data objects not connected in the ontology graph.

17. The apparatus of claim 14, wherein the positive distance measure is a translational distance measure between: (i) a sum of: (a) a first document representation for a first document data object associated with the positive relationship and a relational representation for the positive relationship, and (ii) a second document representation for a second document data object associated with the positive relationship.

18. A computer program product comprising at least one non-transitory computer-readable storage medium having computer-readable program code portions stored therein, the computer-readable program code portions, when executed by one or more processors, cause the one or more processors to:

identify a plurality of word vectors associated with a document data object characterized by an ontology graph;

identify one or more relationships of the document data object based at least in part on the ontology graph;

generate, using a graph-embedding-based paragraph vector machine learning model, a document representation and one or more relational representations for the one or more relationships based at least in part on the plurality of word vectors and the one or more relationships, wherein:

the graph-embedding-based paragraph vector machine learning model is configured to optimize a textual-relational optimization output that comprises a textual optimization sub-output and a relational optimization sub-output, the textual optimization sub-output is generated based at least in part on (a) the plurality of word vectors, (b) the document representation, and (c) a weighted distance value for a secondary document data object of a plurality of document data objects other than the document data object, the weighted distance value is determined based at least in part on (a) a distance value between the document data object and the secondary document data object and (b) a relational representation for a relationship type of the secondary document data object and the document data object, and the relational optimization sub-output is generated based at least in part on the document representation and the one or more relational representations; and perform one or more prediction-based actions based at least in part on at least one of the document representation and the one or more relational representations.

19. The computer program product of claim 18, wherein the one or more relational representations comprise:

for the secondary document data object, an inferred scalar weight value for a relationship of the one or more relationships between the document data object and the secondary document data object.

20. The computer program product of claim 18, wherein the one or more relational representations comprise:

for the secondary document data object, an inferred vector representation for a relationship of the one or more relationships between the document data object and the secondary document data object.

21. The computer program product of claim 18, wherein the relational optimization sub-output is generated based at least in part on a positive distance measure for a positive relationship in a positive subset of the one or more relationships and a negative distance measure for a negative relationship in a negative subset of the one or more relationships.

* * * * *